US012637356B2

(12) United States Patent
Kakigi et al.

(10) Patent No.: US 12,637,356 B2
(45) Date of Patent: May 26, 2026

(54) HEXAGONAL BORON NITRIDE POWDER AND METHOD FOR PRODUCING THE SAME

(71) Applicant: Tokuyama Corporation, Shunan (JP)

(72) Inventors: Tomoyuki Kakigi, Shunan (JP); Shota Daiki, Shunan (JP)

(73) Assignee: Tokuyama Corporation, Shunan (JP)

( * ) Notice: Subject to any disclaimer, the term of this patent is extended or adjusted under 35 U.S.C. 154(b) by 472 days.

(21) Appl. No.: 18/277,847

(22) PCT Filed: Feb. 22, 2022

(86) PCT No.: PCT/JP2022/007180
§ 371 (c)(1),
(2) Date: Aug. 18, 2023

(87) PCT Pub. No.: WO2022/181593
PCT Pub. Date: Sep. 1, 2022

(65) Prior Publication Data

US 2024/0150186 A1 May 9, 2024

(30) Foreign Application Priority Data

Feb. 26, 2021 (JP) ................................. 2021-029591

(51) Int. Cl.
*C01B 21/064* (2006.01)
*C01B 35/14* (2006.01)

(52) U.S. Cl.
CPC ........ *C01B 35/146* (2013.01); *C01P 2002/30* (2013.01); *C01P 2004/61* (2013.01); *C01P 2006/12* (2013.01)

(58) Field of Classification Search
None
See application file for complete search history.

(56) References Cited

U.S. PATENT DOCUMENTS

| | | | |
|---|---|---|---|
| 10,919,767 | B2 | 2/2021 | Daiki et al. |
| 2014/0314652 | A1 | 10/2014 | Matsumoto et al. |
| 2019/0225494 | A1 | 7/2019 | Daiki et al. |
| 2021/0273295 | A1 | 9/2021 | Hatayama et al. |
| 2023/0014886 | A1 | 1/2023 | Daiki et al. |

FOREIGN PATENT DOCUMENTS

| | | | |
|---|---|---|---|
| CN | 104024153 | A | 9/2014 |
| CN | 108795354 | A | 11/2018 |
| CN | 109317096 | A | 2/2019 |
| CN | 111285337 | A | 6/2020 |
| JP | H05186205 | A | 7/1993 |
| JP | 2014094878 | A | 5/2014 |
| JP | 2015193752 | A | 11/2015 |
| JP | 2019182737 | A | 10/2019 |
| JP | 2020075845 | A | 5/2020 |
| JP | 6758875 | B2 | 9/2020 |
| TW | 201831399 | A | 9/2019 |
| WO | 2019235112 | A1 | 12/2019 |
| WO | 2021124961 | A1 | 6/2021 |

*Primary Examiner* — Yun Qian
(74) *Attorney, Agent, or Firm* — The Webb Law Firm

(57) ABSTRACT

Provided is a hexagonal boron nitride powder capable of obtaining a resin composition excellent in solder heat resistance.
The solder heat resistance of the resin composition can be improved by using a hexagonal boron nitride powder having a ratio ($S_W/S_N$) of a BET specific surface area ($S_W$) measured using water as an adsorbed species to a BET specific surface area ($S_N$) measured using nitrogen as an adsorbed species of 0.07 or less. In addition, by a method for producing a hexagonal boron nitride powder, including a step of heat-treating a coarse hexagonal boron nitride powder having an amount of eluted boron of 60 ppm or less at 1300° C. or higher and 2200° C. or lower in a nitrogen atmosphere having a dew point temperature of −85° C. or lower, a hexagonal boron nitride powder capable of improving the solder heat resistance of the resin composition can be obtained.

5 Claims, No Drawings

HEXAGONAL BORON NITRIDE POWDER AND METHOD FOR PRODUCING THE SAME

CROSS-REFERENCE TO RELATED APPLICATIONS

This application is the United States national phase of International Application No. PCT/JP2022/007180 filed Feb. 22, 2022, and claims priority to Japanese Patent Application No. 2021-029591 filed Feb. 26, 2021, the disclosures of which are hereby incorporated by reference in their entireties.

BACKGROUND OF THE INVENTION

Field of the Invention

The present invention relates to a novel hexagonal boron nitride powder. Specifically, the present invention relates to a hexagonal boron nitride powder capable of obtaining a resin composition having good solder heat resistance.

Description of Related Art

In recent years, performance of digital information communication devices has been advanced, such as development of 5G (5th generation mobile communication system), and accordingly, high integration and miniaturization of semiconductor devices have been promoted, and an amount of heat generated from the devices has been on an increasing trend. Therefore, as a measure against heat dissipation from the device, a resin composition in which a thermally conductive filler is filled in a resin is used as a heat dissipation material. Demand for such a resin composition is increasing because it is excellent in thermal conductivity and formability and easy to handle, and particularly in recent years, a resin composition using the hexagonal boron nitride powder as the thermally conductive filler has been actively developed.

There are various requirements for resin compositions used as heat dissipation materials, and one of them is the solder heat resistance. When the resin composition represented by a printed circuit board is soldered, high heat of about 250° C. to 350° C. is generally applied. In a resin composition having low solder heat resistance, expansion occurs due to the high heat, and cracking and breakage are caused at a solder joint. Therefore, it is desired to improve the solder heat resistance of the resin composition.

Conventionally, it has been widely practiced to improve the solder heat resistance of a heat dissipation sheet or the printed circuit board by selecting a resin having higher heat resistance as the resin of the resin composition.

For example, Patent Document 1: Japanese Patent No. 6758875 reports that in a resin composition containing a resin and a heat dissipation filler such as boron nitride, the solder heat resistance of the resin composition is improved by using a polyimide copolymer having a specific structure and a high glass transition temperature as the resin.

SUMMARY OF THE INVENTION

Problems to be Solved by the Invention

As described above, conventionally, in order to improve the solder heat resistance of the resin composition, a chemical structure of the resin has been controlled, but there has been a problem that the resin that can be used is limited.

On the other hand, as a means for improving the solder heat resistance of the resin composition without limiting the resin to be used, it is conceivable to control a filler as a main component other than the resin, but there has been no knowledge so far on a relationship between characteristics of the filler and the solder heat resistance, and it has been unclear how the characteristics of the filler can be controlled to improve the solder heat resistance of the resin composition. The present invention has been made in view of the above circumstances, and an object of the present invention is to provide a hexagonal boron nitride powder capable of obtaining a resin composition excellent in solder heat resistance.

Means to Solve the Problems

A main cause of decrease in solder heat resistance is a trace amount of moisture or a low molecular weight compound contained in the resin composition. When the high heat is applied during soldering, the moisture in the resin composition is vaporized and expanded, to cause the expansion of the resin composition. Conventionally, it has been considered that a substance that causes such solder heat resistance is derived from the resin, but the present inventors have found that these components are also attached to a surface of the hexagonal boron nitride powder, to cause the decrease in solder heat resistance.

As a result of further studies, the present inventors have obtained findings that by a value of a ratio ($S_W/S_N$) of a BET specific surface area ($S_W$) measured using water as an adsorbed species to a BET specific surface area ($S_N$) measured using nitrogen as an adsorbed species, ease of adhesion of a substance that causes the decrease in solder heat resistance to the surface of the hexagonal boron nitride powder can be evaluated. Then, the present inventors have found that a resin composition having high solder heat resistance can be obtained by using a hexagonal boron nitride powder having $S_W/S_N$ controlled to a value smaller than that of conventional hexagonal boron nitride.

That is, the present invention is a hexagonal boron nitride powder having a ratio ($S_W/S_N$) of a BET specific surface area ($S_W$) measured using water as an adsorbed species to a BET specific surface area ($S_N$) measured using nitrogen as an adsorbed species of 0.07 or less. The hexagonal boron nitride powder preferably has an amount of eluted boron of 40 ppm or less, an amount of eluted sodium of 1 ppm or less, and an amount of eluted calcium of 50 ppm or less. Further, the hexagonal boron nitride powder preferably has an average particle size of 1 to 150 μm, and the BET specific surface area ($S_N$) measured using nitrogen as the adsorbed species of 15 $m^2/g$ or less.

Furthermore, the present invention is a method for producing a hexagonal boron nitride powder, including a step of firing a coarse hexagonal boron nitride powder having an amount of eluted boron of 60 ppm or less at 1300° C. or higher and 2200° C. or lower.

DESCRIPTION OF THE INVENTION

The resin composition having high solder heat resistance can be obtained by using the hexagonal boron nitride powder of the present invention. By using the resin composition as a heat dissipation resin sheet or a heat dissipation substrate, the expansion does not occur even when the high heat is applied during processing using solder, so that it is easy to prevent the resin composition from being cracked or broken, and yield in semiconductor device production can be improved.

EMBODIMENTS FOR CARRYING OUT THE INVENTION

<Hexagonal Boron Nitride Powder>

A hexagonal boron nitride powder of the present invention has a ratio ($S_W/S_N$) of a BET specific surface area ($S_W$) measured using water as an adsorbed species to a BET specific surface area ($S_N$) measured using nitrogen as an adsorbed species of 0.07 or less. Hexagonal boron nitride is a particle including boron and nitrogen and having a hexagonal structure.

The hexagonal boron nitride powder of the present invention has $S_W/S_N$ of 0.07 or less.

Such a ratio makes it possible to obtain a resin composition having high solder heat resistance.

The reason why the solder heat resistance is improved by setting $S_W/S_N$ to 0.07 or less is not clear, but the present inventors infer as follows.

$S_W/S_N$ is a parameter that depends on an affinity between the hexagonal boron nitride powder and a hydrophilic substance. The BET specific surface area ($S_N$) measured using nitrogen as the adsorbed species is calculated from an adsorption amount of nitrogen gas adsorbed on surface of powder particles as the adsorbed species having a known adsorption occupation area, and is an actual specific surface area of the powder. Alternatively, the BET specific surface area ($S_W$) measured using water vapor as the adsorbed species is calculated from an adsorption amount of water vapor adsorbed on the surface of powder particles as the adsorbed species having a known adsorption occupation area. Since water molecules have polarity, unlike when nitrogen is used as the adsorbed species, the BET specific surface area ($S_W$) is calculated as an apparent specific surface area considering influence of hydrophilicity of the powder. Therefore, it is possible to evaluate a surface state of the powder, particularly ease of adhesion of the hydrophilic substance to the surface of the powder, by $S_W/S_N$.

Then, the hexagonal boron nitride powder having a small $S_W/S_N$ hardly causes the hydrophilic substance to adhere to the surface and thus hardly absorbs moisture, and as compared with the hexagonal boron nitride powder having a large $S_W/S_N$, the hexagonal boron nitride powder can prevent moisture that causes the decrease in solder heat resistance from being mixed into the resin composition, so that it is presumed that the resin composition having good solder heat resistance is obtained.

When $S_W/S_N$ is small, the solder heat resistance of the resin composition is more easily improved, and thus $S_W/S_N$ of the hexagonal boron nitride powder is more preferably 0.06 or less. When $S_W/S_N$ of the hexagonal boron nitride powder is excessively small, handling and production are difficult, and thus $S_W/S_N$ is preferably 0.01 or more, and more preferably 0.03 or more.

When impurities are present on the surface of the hexagonal boron nitride powder of the present invention, the impurities may cause the water molecules to be absorbed, and thus it is preferred that the hexagonal boron nitride powder of the present invention has few impurities, specifically, an amount of eluted boron is 40 ppm or less, an amount of eluted sodium is 1 ppm or less, and an amount of eluted calcium is 50 ppm or less. By setting the impurities within the above range, it is easy to reduce $S_W/S_N$, and it is easy to obtain the resin composition having high solder heat resistance. The hexagonal boron nitride powder of the present invention more preferably has an amount of eluted boron of 20 ppm or less, an amount of eluted sodium of 0.5 ppm or less, and an amount of eluted calcium of 20 ppm or less.

The hexagonal boron nitride powder of the present invention may be a single particle or agglomerated particles. A particle size of the hexagonal boron nitride powder of the present invention is not particularly limited, but the average particle size is preferably 1 μm or more, more preferably 10 μm or more, and still more preferably 15 μm or more. By setting the average particle size to 1 μm or more, it is easy to increase thermal conductivity of the resin composition. In addition, the average particle size is preferably 150 μm or less, more preferably 100 μm or less, and still more preferably 60 μm or less. By setting the average particle size to 150 μm or less, it is easy to obtain a resin composition in which the hexagonal boron nitride powder is uniformly dispersed in the resin.

The BET specific surface area ($S_N$) of the hexagonal boron nitride powder of the present invention measured using nitrogen as the adsorbed species is not particularly limited, but is preferably 15 $m^2/g$ or less, more preferably 10 $m^2/g$ or less, and still more preferably 4 $m^2/g$ or less. By setting the $S_N$ to 15 $m^2/g$ or less, it is easy to reduce viscosity of the resin composition, and to obtain a resin composition excellent in handleability. Further, the $S_N$ is preferably 0.5 $m^2/g$ or more, and more preferably 1.0 $m^2/g$ or more. By setting the $S_N$ to 0.5 $m^2/g$ or more, it is easy to increase the thermal conductivity of the resin composition.

A tap density of the hexagonal boron nitride powder of the present invention is preferably 0.3 to 0.9 $g/cm^3$, and more preferably 0.4 to 0.8 $g/cm^3$. The hexagonal boron nitride powder having a tap density within the above range can be uniformly and easily dispersed in the resin composition.

By filling the resin with the hexagonal boron nitride powder of the present invention, it is possible to obtain a resin composition having high thermal conductivity and high solder heat resistance, and suitable for heat dissipation applications, and thus it is preferable to use the hexagonal boron nitride powder as a thermally conductive filler.

A method for storing the hexagonal boron nitride powder of the present invention is preferably a method capable of preventing mixing of moisture and impurities, and an example thereof is a method of placing the hexagonal boron nitride powder in a polypropylene container or a glass container and substituting a gas phase portion with nitrogen.

<Method for Producing Hexagonal Boron Nitride Powder>

A method for producing the hexagonal boron nitride powder of the present invention is not particularly limited, but for example, the hexagonal boron nitride powder can be produced by a method for producing the hexagonal boron nitride powder, including a step of heat-treating a coarse hexagonal boron nitride powder having an amount of eluted boron of 60 ppm or less at 1300° C. or higher and 2200° C. or lower in a high-purity nitrogen atmosphere having a dew point temperature of −85° C. or lower.

In the method for producing the hexagonal boron nitride powder of the present invention, the method for obtaining the coarse hexagonal boron nitride powder is not particularly limited, but for example, it is possible to obtain the coarse hexagonal boron nitride powder by reacting boron with nitrogen to synthesize a nitride powder, and then performing washing and drying.

A step of obtaining the nitride powder is not particularly limited, and may be a reduction nitriding method of reacting an oxygen-containing boron compound with nitrogen at a high temperature, or a melamine method by thermal decomposition of melamine borate, but the reduction nitriding method is more preferable from the viewpoint of time and cost required for a heating step.

In the reduction nitriding method, generally, the oxygen-containing boron compound and an auxiliary agent are mixed to obtain a raw material mixed powder, and the nitride powder can be efficiently obtained by heating the raw material mixed powder in a nitrogen atmosphere. Examples of the oxygen-containing boron compound include boron trioxide, diboron dioxide, tetraboron trioxide, metaboric acid, perboric acid, orthoboric acid, sodium tetraborate, and sodium perborate. Generally, boric acid which is easily available is used. As the auxiliary agent, a carbon source and an oxygen-containing alkaline earth metal compound can be used. Examples of the carbon source include carbon black, activated carbon, nanocarbon, and boron carbide. Generally, inexpensive carbon black is used. Examples of the oxygen-containing alkaline earth metal include magnesium oxide, calcium oxide, magnesium carbonate, and calcium carbonate. A method for mixing the oxygen-containing boron compound and the auxiliary agent is not particularly limited, and can be performed using a general mixer such as a vibration mill, a bead mill, a ball mill, or a mixer. A step of heating the raw material mixed powder in a nitrogen atmosphere is not particularly limited as long as a nitriding reaction can proceed to obtain the nitride powder. A heating temperature is preferably 1500° C. or higher, and more preferably 1800° C. to 2000° C. By setting the heating temperature to 1500° C. or higher, production of amorphous boron nitride is suppressed, and the hexagonal boron nitride is easily obtained.

Since the nitride powder obtained by the nitriding reaction is generally obtained as a solid of several mm or more, it is preferable to crush the solid to a size of 500 μm or less before performing washing with acid described below. By crushing the nitride powder, the acid easily permeates into the nitride powder by acid washing described below, and the nitride powder is easily washed efficiently. In addition, when heat treatment described below is performed, nitrogen can be allowed to flow into the nitride powder, and a hexagonal boron nitride powder having a small $S_W/S_N$ can be efficiently produced. A crushing method is not particularly limited, and examples thereof include a stone mill type grinder, a ball mill, and a mortar.

The nitride powder contains, for example, an alkali metal salt and the oxygen-containing boron compound as unreacted materials and byproducts. These components have hygroscopicity, and when present on the surface of the hexagonal boron nitride powder, an $S_W/S_N$ value tends to increase, and thus it is preferable to remove these components by the washing with acid. The acid used in the washing with acid is not particularly limited, and examples thereof include hydrochloric acid, sulfuric acid, nitric acid, and acetic acid. A method for the washing with acid is not particularly limited as long as the above-mentioned unreacted materials and byproducts can be sufficiently removed, and an example thereof is a method of mixing 50 to 200 parts by mass of concentrated hydrochloric acid (37% aqueous hydrogen chloride solution) and 200 to 500 parts by mass of pure water with 100 parts by mass of nitride powder to form an acid slurry, and stirring the acid slurry for 6 hours or more.

After the washing with acid is performed, washing with pure water is usually performed in order to remove the acid remaining on the surface of the nitride powder. A method for the washing with pure water is not particularly limited as long as the acid remaining on the surface of the nitride powder can be sufficiently removed. For example, there is a method in which the acid slurry after stirring is filtered to remove a solvent, then pure water equal to or more than an amount of the nitride powder is added to prepare a water slurry, the water slurry is stirred, and this operation is repeated until the water slurry shows pH 7.

After the washing with pure water is performed, it is preferable to perform a drying treatment in order to remove moisture remaining on the surface of the nitride powder. Drying conditions are not particularly limited, but heating at 80° C. to 250° C. under a reduced pressure atmosphere is preferred. When a drying temperature is lower than 80° C., it takes time to remove moisture, and when the drying temperature is higher than 250° C., the remaining moisture and boron nitride react with each other, hydrolysis proceeds, and the eluted boron may increase. A lower limit of the degree of pressure reduction is not particularly limited, but is preferably 100 kPa or less. By setting the degree of pressure reduction to 100 kPa or less, the moisture can be efficiently removed. Weight moisture content of the nitride powder before drying is preferably 40% or less. When the weight moisture content is more than 40%, a drying time is long, and by applying heat for a long time, the hydrolysis proceeds, and the eluted boron may increase.

After washing, classification may be performed to adjust the particle size or remove coarse particles. Examples of a classification method include classification by sieving and wind force classification.

The hexagonal boron nitride powder of the present invention can be obtained by heating the coarse hexagonal boron nitride powder having an amount of eluted boron of 60 ppm or less, which is obtained by the method as described above, at 1300° C. or higher and 2200° C. or lower in a nitrogen atmosphere having a dew point temperature of −85° C. or lower.

The step of heat-treating the coarse hexagonal boron nitride powder is not particularly limited as long as the coarse hexagonal boron nitride powder can be heated at 1300° C. or higher and 2200° C. or lower in a nitrogen atmosphere having a dew point temperature of −85° C. or lower, and can be performed by a known method. Specifically, for example, the coarse hexagonal boron nitride powder is placed in a heating kiln, an inside of the kiln is replaced with nitrogen, and then the temperature is raised to a desired temperature while flowing nitrogen.

On a surface of the coarse hexagonal boron nitride powder before being subjected to the heat treatment, hydrophilic functional groups such as an amino group and a hydroxy group generated in a step of producing the hexagonal boron nitride powder are present. When the hydrophilic functional group such as an amino group or a hydroxy group is present, $S_W/S_N$ of the hexagonal boron nitride powder is a large value, but it is presumed that by performing the heat treatment, these functional groups can be efficiently removed to obtain a hexagonal boron nitride powder having $S_W/S_N$ of 0.07 or less. A temperature of the heat treatment is preferably 1300° C. or higher, more preferably 1400° C. or higher, and still more preferably 1600° C. or higher. In addition, the temperature of the heat treatment is preferably 2200° C. or lower, more preferably 2000° C. or lower, and still more preferably 1800° C. or lower. When the temperature of the heat treatment is lower than 1300° C., the amino group and the hydroxy group may not be sufficiently removed, and when the temperature is higher than 2200° C., the boron nitride may be decomposed or yellowed.

By using nitrogen having a dew point temperature of −85° C. or lower during the heat treatment, it is possible to prevent hydrolysis of the hexagonal boron nitride due to trace moisture in nitrogen in the kiln, and to suppress regeneration of functional groups such as an amino group and a hydroxy group. As the dew point temperature of nitrogen is lower, the regeneration of the amino group and the hydroxy group is more easily suppressed, but nitrogen having a low dew point temperature is difficult to handle and disadvantageous in terms of cost, and thus a lower limit of the dew point temperature is −100° C., and preferably −90° C. After the heat treatment, it is preferable to cool the inside of the kiln to room temperature by allowing nitrogen to flow, and then open the kiln, because hydrolysis of the hexagonal boron nitride can be easily suppressed.

A treatment time of the heat treatment is not particularly limited, but is usually preferably 1 hour or more, and more preferably 2 hours or more. Further, the treatment time is preferably 18 hours or less, and more preferably 12 hours or less.

Furthermore, when the amount of eluted boron of the coarse hexagonal boron nitride powder is 60 ppm or less, the amount of eluted sodium is 1 ppm or less, and the amount of eluted calcium is 50 ppm or less, moisture absorption of the coarse hexagonal boron nitride powder and hydrolysis during the heat treatment can be suppressed, and the hydrophilic functional group on a surface of the coarse hexagonal boron nitride can be efficiently removed by the heat treatment. Above treatments make it possible to obtain the hexagonal boron nitride powder having $S_W/S_N$ of 0.07 or less.

Further, the weight moisture content of the coarse hexagonal boron nitride powder is preferably 0.5% or less, and more preferably 0%. When the weight moisture content is high, the hydrolysis proceeds during the heat treatment, and $S_W/S_N$ may increase.

After the heat treatment is performed, the classification may be performed to adjust the particle size or remove the coarse particles. Examples of a classification method include classification by sieving and wind force classification.

<Resin Composition>

The resin composition of the present invention contains at least the hexagonal boron nitride powder of the present invention and the resin. The resin composition is excellent in solder heat resistance, is less likely to be expanded or damaged by heat, and is useful as, for example, a printed circuit board resin, a semiconductor sealing material, and a heat dissipation sheet.

The resin constituting the resin composition is not particularly limited, and may be, for example, a silicone-based resin or a curable epoxy-based resin. Examples of the curable epoxy-based resin include a bisphenol A type epoxy resin, a bisphenol S type epoxy resin, a bisphenol F type epoxy resin, a bisphenol A type hydrogenated epoxy resin, a polypropylene glycol type epoxy resin, a polytetramethylene glycol type epoxy resin, a naphthalene type epoxy resin, a phenylmethane type epoxy resin, a tetrakis phenol methane type epoxy resin, a biphenyl type epoxy resin, a phenol novolac type epoxy resin, a tetrafunctional naphthalene type epoxy resin, a cresol novolac type epoxy resin, a dicyclopentadiene type epoxy resin, a trisphenol epoxy resin, a naphthol novolac epoxy resin, a naphthylene ether type epoxy resin, an aromatic glycidylamine type epoxy resin, a hydroquinone type epoxy resin, a stilbene type epoxy resin, a triphenol methane type epoxy resin, an aralkyl type epoxy resin, a polypropylene glycol type epoxy resin, a polysulfide modified epoxy resin, an epoxy resin having a triazine nucleus in the skeleton, and a bisphenol A alkylene oxide adduct type epoxy resin. One of these curable epoxy resins may be used alone, or two or more thereof may be used in combination. Further, as a curing agent, for example, an amine-based resin, an acid anhydride-based resin, a phenol-based resin, imidazoles, an active ester-based curing agent, a cyanate ester-based curing agent, a naphthol-based curing agent, or a benzoxazine-based curing agent may be used. One of these curing agents may also be used alone, or two or more thereof may be used in combination. A blending amount of the curing agents based on the epoxy resin is 0.5 to 1.5 equivalent ratio, and preferably 0.7 to 1.3 equivalent ratio in terms of an equivalent ratio based on the epoxy resin. In the present specification, the curing agents are also included in the resin.

Further, as the silicone-based resin, a known curable silicone resin that is a mixture of an addition reaction type silicone resin and a silicone-based crosslinking agent can be used without limitation. Examples of the addition reaction type silicone resin include polyorganosiloxanes such as polydimethylsiloxane having an alkenyl group such as a vinyl group or a hexenyl group as a functional group in a molecule thereof. Examples of the silicone-based crosslinking agent include polyorganosiloxanes having a silicon-bonded hydrogen atom, such as a dimethylhydrogensiloxy group-terminated dimethylsiloxane-methylhydrogensiloxane copolymer, a trimethylsiloxy group-terminated dimethylsiloxane-methylhydrogensiloxane copolymer, a trimethylsiloxane group-terminated poly(methylhydrogen siloxane), and poly(hydrogen silsesquioxane). Further, as a curing catalyst, for example, a known platinum-based catalyst used for curing the silicone resin can be used without limitation. Examples of the curing catalyst include particulate platinum, particulate platinum supported on carbon powder, chloroplatinic acid, alcohol-modified chloroplatinic acid, an olefin complex of chloroplatinic acid, palladium, and a rhodium catalyst.

Further, as the resin, for example, liquid crystal polymer, polyester, polyamide, polyimide, polyphthalamide, polyphenylene sulfide, polycarbonate, polyaryletherketone, polyphenylene oxide, fluororesin, cyanate ester compound, or maleimide compound can also be used.

As the liquid crystal polymer, there are thermotropic liquid crystal polymer exhibiting liquid crystallinity in a molten state and rheotropic liquid crystal polymer exhibiting liquid crystallinity in a solution state, and any liquid crystal polymer may be used.

Examples of the thermotropic liquid crystal polymer include a polymer synthesized from parahydroxybenzoic acid (PHB), terephthalic acid, and 4,4'-biphenol, a polymer synthesized from PHB and 2,6-hydroxynaphthoic acid, and a polymer synthesized from PHB, terephthalic acid, and ethylene glycol.

Examples of the fluororesin include tetrafluoroethylene resin (PTFE), tetrafluoroethylene-hexafluoropropylene copolymer resin (PFEP), and tetrafluoroethylene perfluoroalkyl vinyl ether copolymer resin (PFA).

As the cyanate ester compound, for example, a phenol novolac type cyanate ester compound, a naphthol aralkyl type cyanate ester compound, a biphenyl aralkyl type cyanate ester compound, a naphthylene ether type cyanate ester compound, a xylene resin type cyanate ester compound, and an adamantane skeleton type cyanate ester compound are preferable, and examples thereof include the phenol novolac type cyanate ester compound, the biphenyl aralkyl type cyanate ester compound, and the naphthol aralkyl type cyanate ester compound.

Examples of the maleimide compound include N-phenylmaleimide, N-hydroxyphenylmaleimide, bis(4-maleimidophenyl)methane, 2,2-bis{4-(4-maleimidophenoxy)-phenyl}propane, bis(3,5-dimethyl-4-maleimidophenyl) methane, bis(3-ethyl-5-methyl-4-maleimidophenyl) methane, bis(3,5-diethyl-4-maleimidophenyl)methane, a maleimide compound represented by the following formula (1), and a maleimide compound represented by the following formula (2).

[Chemical Formula 1]

(1)

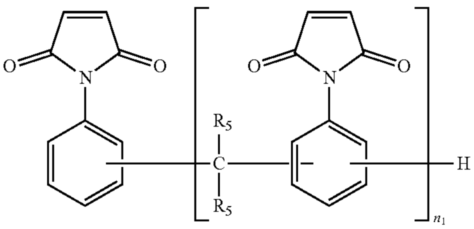

In the above formula (1), $R_5$'s each independently represents a hydrogen atom or a methyl group, and preferably represents a hydrogen atom. In addition, $n_1$ represents an integer of 1 or more, preferably an integer of 10 or less, and more preferably an integer of 7 or less.

[Chemical Formula 2]

(2)

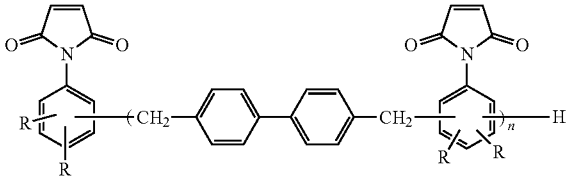

In the above formula (2), a plurality of Rs each independently represents a hydrogen atom, an alkyl group having 1 to 5 carbon atoms (for example, a methyl group, an ethyl group, a n-propyl group, an isopropyl group, a n-butyl group, an isobutyl group, a t-butyl group, and a n-pentyl group), or a phenyl group, and from the viewpoint of further improving flame resistance and peel strength, R is preferably a group selected from the group consisting of a hydrogen atom, a methyl group, and a phenyl group, more preferably one of a hydrogen atom and a methyl group, and still more preferably a hydrogen atom.

The content of the hexagonal boron nitride powder of the present invention in the resin composition is preferably 30 to 80 vol %, and more preferably 40 to 70 vol %. When the content of the hexagonal boron nitride powder is less than 30 vol %, the thermal conductivity of the resin composition tends to decrease, and when the content of the hexagonal boron nitride powder is more than 80 vol %, the number of voids increases, and insulation resistance may decrease. Although it is also possible to mix and fill the hexagonal boron nitride powder of the present invention and other hexagonal boron nitride powders into the resin composition of the present invention, in that case, 50 mass % or more, preferably 80 mass % or more, and more preferably 100 mass % of the entire hexagonal boron nitride powder is preferably the hexagonal boron nitride powder of the present invention.

The content of the resin in the resin composition corresponds to the content obtained by subtracting the content of the hexagonal boron nitride powder from the total volume when the total volume of the composition is 100 vol %, and when the curing agent is contained, the content of the resin is preferably 70 to 20 vol %, and more preferably 60 to 30 vol % including the volume of the curing agent.

In addition, the resin composition may contain the hexagonal boron nitride powder and a component other than the resin, and may appropriately contain, for example, an inorganic filler other than the hexagonal boron nitride, a discoloration inhibitor, a surfactant, a dispersant, and a coupling agent within a range that does not affect the effects of the present invention. Examples of the inorganic filler include aluminum oxide, silicon oxide, zinc oxide, magnesium oxide, titanium oxide, silicon nitride, aluminum nitride, aluminum hydroxide, magnesium hydroxide, silicon carbide, calcium carbonate, barium sulfate, and talc. The content of these components is preferably 25 vol % or less, and more preferably 15 vol % or less when the total volume of the composition is 100 vol %.

A method for producing the resin composition is not particularly limited, and for example, when the resin is the curable epoxy resin, a method for producing the resin composition can be employed which includes a mixing step of mixing the curable epoxy resin, the hexagonal boron nitride powder of the present invention, and other components as necessary to obtain a curable composition, a molding step of molding the curable composition into a desired shape, and a curing step of curing the curable composition.

In the mixing step, the method is not particularly limited as long as the components can be uniformly mixed to obtain the curable composition, and for example, the mixing can be performed using a device such as a general stirrer, a planetary mixer, or a rotation-revolution mixer.

In the mixing step, a solvent having high affinity with the resin to be used may be added in order to improve dispersibility of the hexagonal boron nitride powder and other components in the resin and to reduce viscosity of the curable composition to facilitate molding into a desired shape. Note that when molding by coating is employed in the molding step described below, it is particularly preferable to add the solvent to the curable composition. Examples of the solvent include ketones such as cyclohexanone, methyl ethyl ketone, methyl isobutyl ketone, and diisobutyl ketone; glycol ethers such as ethylene glycol monomethyl ether and ethylene glycol monobutyl ether; and ether alcohols such as 2-methoxyethanol, 1-methoxyethanol, 2-ethoxyethanol, 1-ethoxy-2-propanol, 2-butoxyethanol, 2-(2-methoxyethoxy)ethanol, 2-(2-ethoxyethoxy)ethanol, and 2-(2-butoxyethoxy)ethanol. One of these solvents may also be used alone, or two or more thereof may be used in combination.

The molding step is not particularly limited as long as the curable composition can be molded into a desired shape, and for example, the molding can be performed by filling the curable composition into a mold, but when the desired shape is a plate shape, the molding may be performed by applying the curable composition onto a base material such as a film or a metal foil so as to have a uniform thickness.

When the curable composition contains the solvent, it is preferable to remove the solvent from the curable composition after the molding step and before the curing step.

When a large amount of the solvent remains in the curable composition, voids are likely to be generated in the resulting resin composition, and the solder heat resistance and the insulation resistance of the resin composition are likely to decrease. A method for removing the solvent is not particularly limited, and examples thereof include ventilation drying in an open system, heating drying in an oven, and drying at room temperature/heating under reduced pressure in a vacuum dryer. In order to prepare a resin composition having a smooth surface without generating air bubbles due to volatilization of the solvent, it is preferable to remove a certain amount of the solvent by drying at room temperature under reduced pressure, and then heating and drying under reduced pressure. The drying time and the drying temperature may be appropriately selected depending on the solvent to be used, but in order to sufficiently remove the solvent, the drying time is generally 40 minutes or more, and the drying temperature is 100° C. or more.

The curing step is a step of curing the molded curable composition, and when the resin is the curable epoxy resin, the curable epoxy resin can be crosslinked by heating to form a three-dimensional network and cured to obtain the resin composition. It should be noted that by compressing or heating the curable epoxy resin under reduced pressure to cure the curable epoxy resin by heating, it is possible to perform defoaming efficiently and facilitate improvement of insulation properties of the resin composition, which is a preferred form.

As application of the resin composition, there is a heat dissipation material, for example, a thermally conductive sealing material, a heat dissipation paint, or an insulating layer of the printed circuit board or a metal base substrate. When the resin composition is used as the insulating layer of the metal base substrate, the metal base substrate can be produced by coating the curable composition onto the metal foil to form the metal foil into a plate shape, then placing the metal foil on a surface of the curable composition opposite to the metal foil, and heating the metal foil to a high temperature while pressurizing the metal foil to cure the curable composition, and fixing the metal foil and the resin composition. The metal foil is not particularly limited as long as it is used in electrical insulating material applications, and examples thereof include a copper foil and an aluminum foil. Further, when the metal foil is heated under reduced pressure, a dense resin composition can be easily produced by efficiently removing gas components, and a resin composition excellent in solder heat resistance and insulation resistance can be easily obtained.

EXAMPLES

Hereinafter, the present invention will be specifically described with reference to Examples, but the present invention is not limited to these Examples. Note that measurement of values in Examples and Comparative Examples was performed by the following method.

(1) BET Specific Surface Area Ratio ($S_W/S_N$)

BET specific surface areas $S_W$ and $S_N$ were each measured by the following method, and $S_W/S_N$ was calculated from obtained results.

Measurement of $S_W$

Using a high-precision vapor adsorption amount measuring apparatus BELSORP-Aqua3 (manufactured by MicrotracBEL Corp.), a gas adsorption test using a water vapor gas as the adsorbed species was performed, a water vapor adsorption/desorption isotherm was measured, and the specific surface area was calculated from the obtained result. Specifically, the adsorption/desorption isotherm of the water vapor gas was measured using a constant volume method under measurement conditions of an adsorption temperature of 298.15K, a saturated vapor pressure of 3.169 kPa, an equilibrium waiting time of 500 sec, an adsorbate of pure water, an adsorbate molecular weight of 18.020, and an adsorbate cross-sectional area of 0.125 $nm^2$ for the hexagonal boron nitride powder subjected to vacuum drying and degassing at 120° C. for 8 hours as a pretreatment, and $S_W$ was calculated by a BET method.

Measurement of $S_N$

A gas adsorption test using nitrogen gas as the adsorbed species was performed using FlowSorb III 2310 (manufactured by Shimadzu Corporation), a nitrogen adsorption isotherm was measured, and the specific surface area was calculated from the obtained result. Specifically, an adsorption/desorption isotherm of nitrogen gas was measured using a continuous flow method under a condition of a gas flow rate of 15 $cm^3$/min for the hexagonal boron nitride powder subjected to vacuum drying and degassing at 200° C. for 10 minutes as a pretreatment, and $S_N$ was calculated by the BET method.

(2) Average Particle Size (D50) of Hexagonal Boron Nitride Powder

Measurement was performed by a laser diffraction method using a laser diffraction/scattering type particle size measuring apparatus MT3000 (manufactured by MicrotracBEL Corp.). Specifically, 0.1 g of the hexagonal boron nitride powder was charged into a mixing tank which is attached to the apparatus and filled with 50 cc of ethanol, and a sample obtained by ultrasonically dispersing the hexagonal boron nitride powder under a condition of an output of 40 W for 20 seconds was used for measurement, to calculate a volume-based average particle size (D50).

(3) Tapped Bulk Density of Hexagonal Boron Nitride Powder

A tapped bulk density (g/$cm^3$) was measured using Tap Denser KYT-5000 (manufactured by SEISHIN ENTERPRISE Co., Ltd.). Specifically, 100 mL of hexagonal boron nitride powder was filled in a 100 mL sample cell, and tapping was performed under conditions of a tap speed of 120 times/min, a tap height of 5 cm, and the number of taps of 500 times, and then a weight of the sample cell was measured, to calculate the tapped bulk density.

(4) Amount of Eluted Boron, Amount of Eluted Sodium, and Amount of Eluted Calcium of Coarse Hexagonal Boron Nitride Powder and Hexagonal Boron Nitride Powder 50 g of a sulfuric acid aqueous solution having a concentration of 0.5 mol/L and 2 g of hexagonal boron nitride powder were charged into a 50 mL Iboy wide-mouth bottle, and the liquid was shaken and stirred for 1 minute while the temperature of the liquid was adjusted to 25° C. Thereafter, the liquid was allowed to stand for 120 minutes, then an amount of boron, an amount of sodium, and an amount of calcium in the obtained liquid was analyzed by an ICP emission spectrometer (iCAP6500 manufactured by Thermo Fisher Scientific Inc.), and obtained measurement results were divided by mass of the hexagonal boron nitride powder used in the test, to determine the amount of eluted boron, the amount of eluted sodium, and the amount of eluted calcium per unit mass of the hexagonal boron nitride powder (ppm).

(5) Moisture Content of Coarse Hexagonal Boron Nitride Powder and Hexagonal Boron Nitride Powder Measurement was performed using a heating and drying type moisture analyzer MS-70 (manufactured by A&D Company, Limited). Specifically, 10 g of the coarse hexagonal boron nitride powder or the hexagonal boron nitride powder was weighed in a balance, a weight change was measured while being heated to 200° C., and the measurement was terminated when a weight change amount was 0.01%/min or less. The moisture content was calculated using a difference between a weight before heating and a weight at an end of the measurement as an amount of moisture.

(6) Preparation of Resin Composition/Metal Base Substrate

To 22.5 g (49.2 vol %) of hexagonal boron nitride powder, 7.20 g (30.6 vol %) of a liquid curable epoxy resin (JER828 manufactured by Mitsubishi Chemical Corporation, bisphenol A type epoxy resin, epoxy equivalent: 184 to 194 g/eq), 10.1 g (12.6 vol %) of alumina, and 20 g of cyclohexanone as a solvent were mixed, then 1.80 g (7.6 vol %) of an epoxy resin curing agent (JER cure W manufactured by Mitsubishi Chemical Corporation, modified aromatic amine, amine value: 623 to 639) was added, and the mixture was mixed using a rotation-revolution mixer (MAZERUSTAR KK-2505 manufactured by Kurabo Industries Ltd.) to prepare a curable composition.

The obtained curable composition was coated on a release PET film (PET50×1-FSC6 manufactured by NIPPA Co., Ltd., thickness: 50 μm) using an automatic coating apparatus (PI-1210 manufactured by TESTER SANGYO CO., LTD.) so as to have a film thickness of 300 μm with a Bird applicator. The coated film was air-dried in a draft for 10 minutes, and then dried at 100° C. for 40 minutes using a vacuum dryer to obtain a plate-shaped molded body. Subsequently, the obtained plate-shaped molded body was sandwiched between two 50×100 mm copper foils, and press-bonded by pressing under reduced pressure at 100° C. and a pressing pressure of 15 MPa for 3 minutes. Subsequently, the temperature was raised to 150° C., and the curable composition was cured by pressing under reduced pressure at a pressing pressure of 20 MPa for 60 minutes to prepare the metal base substrate as the resin composition.

(7) Solder Heat Resistance Test

The metal base substrate obtained in the above (6) was subjected to a solder heat resistance test by a method in accordance with JIS C60068-2-20: 2010, and evaluated. That is, as accelerated aging using a constant temperature and humidity chamber, the metal base substrate was held at a relative humidity of 85% and a temperature of 120° C. for 4 hours, and then allowed to stand in standard atmospheric conditions for 2 hours. Thereafter, using a solder bath having a depth of 60 mm and a volume of 730 mL, the metal base substrate was immersed in molten solder at 260° C. for 10 seconds at an immersion rate of 25 mm/s, and then pulled up at a pulling speed of 25 mm/s to obtain a test body. Appearance of the obtained test body was visually inspected, and when there was no expansion, the test body was evaluated as good, and when expansion occurred, the test body was evaluated as poor.

Example 1

700 g of boron oxide, 300 g of carbon black, 200 g of calcium carbonate, and 66 g of boron carbide were mixed with a mixing stirrer. This mixture was heated to 1500° C. under a nitrogen gas atmosphere and held at 1500° C. for 6 hours using a graphite Tammann kiln. After holding at 1500° C., the temperature was raised to 1880° C., and reduction nitriding treatment was performed at 1880° C. for 2 hours to obtain the nitride powder.

Subsequently, the obtained nitride powder was crushed by a stone mill type grinder, then put into a polyethylene container, 500 g of hydrochloric acid (37 mass % HCl) and 1500 g of pure water were added to 500 g of the nitride powder to adjust an acid slurry, and the mixture was stirred for 8 hours to perform the washing with acid. After the washing with acid, the acid slurry was filtered using a Buchner funnel, then a water slurry was adjusted and washed by adding pure water of 10 times or more (mass ratio) the amount of the nitride powder, and then dehydration was performed by suction filtration until the moisture content of the nitride powder became 40 mass % or less.

Thereafter, the nitride powder was dried under reduced pressure of 30 kPaA at 200° C. for 15 hours to have a moisture content of 0.50% or less, then classified through a sieve with an opening of 90 μm, and the powder under the sieve was collected to obtain the coarse hexagonal boron nitride powder. The amount of eluted boron of the obtained coarse hexagonal boron nitride powder was 46 ppm.

The obtained coarse hexagonal boron nitride powder was filled in a carbon baking shelf surface-coated with boron nitride, and placed in the graphite Tammann kiln. Thereafter, the inside of the kiln was depressurized, then nitrogen having a dew point temperature of −85° C. was allowed to flow at a flow rate of 40 NL/min to create a nitrogen atmosphere, the temperature was raised to 1650° C., the heat treatment was performed at 1650° C. for 4 hours, and then the temperature was cooled to room temperature. Subsequently, the nitride powder was classified with a sieve having an opening of 90 μm, and the powder under the sieve was collected to obtain the hexagonal boron nitride powder. The obtained hexagonal boron nitride powder was put in a 2 L lidded polypropylene container, and a gas phase portion was replaced with nitrogen and stored. Table 1 shows production conditions and evaluation results of the obtained hexagonal boron nitride.

Example 2

700 g of boron oxide, 300 g of carbon black, and 200 g of calcium carbonate were mixed with a mixing stirrer. This mixture was heated to 1500° C. under a nitrogen gas atmosphere and held at 1500° C. for 6 hours using a graphite Tammann kiln. After holding at 1500° C., the temperature was raised to 1840° C., and reduction nitriding treatment was performed at 1840° C. for 2 hours to obtain the nitride powder.

Subsequently, the obtained nitride powder was crushed by a stone mill type grinder, then put into a polyethylene container, 500 g of hydrochloric acid (37 mass % HCl) and 1500 g of pure water were added to 500 g of the nitride powder to adjust an acid slurry, and the mixture was stirred for 8 hours to perform the washing with acid. After the washing with acid, the acid slurry was filtered using a Buchner funnel, then a water slurry was adjusted and washed by using pure water of 10 times or more (mass ratio) the amount of the nitride powder, and then dehydration was performed by suction filtration until the moisture content of the nitride powder became 40 mass % or less.

Thereafter, the nitride powder was dried under reduced pressure of 30kPaA at 200° C. for 15 hours to have a moisture content of 0.50% or less, then classified through a sieve with an opening of 90 μm, and the powder under the sieve was collected to obtain the coarse hexagonal boron nitride powder. The amount of eluted boron of the obtained coarse hexagonal boron nitride powder was 18 ppm.

The obtained coarse hexagonal boron nitride powder was filled in a carbon baking shelf surface-coated with boron nitride, and placed in the graphite Tammann kiln. Thereafter, the inside of the kiln was depressurized, then nitrogen having a dew point temperature of −85° C. was allowed to flow at a flow rate of 40 NL/min to create a nitrogen atmosphere, the temperature was raised to 1650° C., the heat treatment was performed at 1650° C. for 4 hours, and then the temperature was cooled to room temperature. Subsequently, the nitride powder was classified with a sieve having an opening of 90 μm, and the powder under the sieve was collected to obtain the hexagonal boron nitride powder. The obtained hexagonal boron nitride powder was put in a 2 L lidded polypropylene container, and a gas phase portion was replaced with nitrogen and stored. Table 1 shows production conditions and evaluation results of the obtained hexagonal boron nitride.

Example 3

700 g of boron oxide, 300 g of carbon black, 200 g of calcium carbonate, and 180 g of boron carbide were mixed with a mixing stirrer. This mixture was heated to 1500° C. under a nitrogen gas atmosphere and held at 1500° C. for 6 hours using a graphite Tammann kiln. After holding at 1500° C., the temperature was raised to 1940° C., and reduction nitriding treatment was performed at 1940° C. for 2 hours to obtain the nitride powder.

Subsequently, the obtained nitride powder was crushed by a stone mill type grinder, then put into a polyethylene container, 500 g of hydrochloric acid (37 mass % HCl) and 1500 g of pure water were added to 500 g of the nitride powder to adjust an acid slurry, and the mixture was stirred for 8 hours to perform the washing with acid. After the washing with acid, the acid slurry was filtered using a Buchner funnel, then a water slurry was adjusted and washed by using pure water of 10 times or more (mass ratio) the amount of the nitride powder, and then dehydration was performed by suction filtration until the moisture content of the nitride powder became 40 mass % or less.

Thereafter, the nitride powder was dried under reduced pressure of 30kPaA at 200° C. for 15 hours to have a moisture content of 0.50% or less, then classified through a sieve with an opening of 90 μm, and the powder under the sieve was collected to obtain the coarse hexagonal boron nitride powder. The amount of eluted boron of the obtained coarse hexagonal boron nitride powder was 32 ppm.

The obtained coarse hexagonal boron nitride powder was classified with a sieve having an opening of 90 μm, and then filled in a carbon baking shelf surface-coated with boron nitride, and placed in the graphite Tammann kiln. Thereafter, the inside of the kiln was depressurized, then nitrogen having a dew point temperature of −85° C. was allowed to flow at a flow rate of 40 NL/min to create a nitrogen atmosphere, the temperature was raised to 1650° C., the heat treatment was performed at 1650° C. for 4 hours, and then the temperature was cooled to room temperature. Subsequently, the nitride powder was classified with a sieve having an opening of 90 μm, and the powder under the sieve was collected to obtain the hexagonal boron nitride powder. The obtained hexagonal boron nitride powder was put in a 2 L lidded polypropylene container, and a gas phase portion was replaced with nitrogen and stored. Table 1 shows production conditions and evaluation results of the obtained hexagonal boron nitride.

Examples 4 to 7

Hexagonal boron nitride powders of Example 4 to 7 were prepared in the same manner as in Example 1 except that the production conditions were changed as shown in Table 1. Table 1 shows production conditions and evaluation results of the obtained hexagonal boron nitride.

Example 8

A mixed powder was prepared by mixing 80 g of anhydrous borax, 50 g of boron oxide, and 45 g of melamine. This mixture was heated to 1250° C. under a nitrogen gas atmosphere and heated at 1250° C. for 2 hours using a graphite Tammann kiln, to obtain the nitride powder by the melamine method.

Subsequently, the obtained nitride powder was crushed by a stone mill type grinder, then put into a polyethylene container, 100 g of hydrochloric acid (37 mass % HCl) and 300 g of pure water were added to 100 g of the nitride powder to adjust an acid slurry, and the mixture was stirred for 8 hours to perform the washing with acid. After the washing with acid, the acid slurry was filtered using a Buchner funnel, then a water slurry was adjusted and washed by using pure water of 10 times or more (mass ratio) the amount of the nitride powder, and then dehydration was performed by suction filtration until the moisture content of the nitride powder became 40 mass % or less.

Thereafter, the nitride powder was dried under reduced pressure of 30kPaA at 150° C. for 15 hours to have a moisture content of 0.50% or less, then classified through a sieve with an opening of 90 μm, and the powder under the sieve was collected to obtain the coarse hexagonal boron nitride powder. The amount of eluted boron of the obtained coarse hexagonal boron nitride powder was 57 ppm.

The obtained coarse hexagonal boron nitride powder was filled in a carbon baking shelf surface-coated with boron nitride, and placed in the graphite Tammann kiln. Thereafter, the inside of the kiln was depressurized, then nitrogen having a dew point temperature of −85° C. was allowed to flow at a flow rate of 40 NL/min to create a nitrogen atmosphere, the temperature was raised to 1350° C., the heat treatment was performed at 1350° C. for 4 hours, and then the temperature was cooled to room temperature. Subsequently, the nitride powder was classified with a sieve having an opening of 90 μm, and the powder under the sieve was collected to obtain the hexagonal boron nitride powder. The obtained hexagonal boron nitride powder was put in a 500 mL lidded polypropylene container, and a gas phase portion was replaced with nitrogen and stored. Table 2 shows production conditions and evaluation results of the obtained hexagonal boron nitride.

Comparative Examples 1, 2, and 5

Hexagonal boron nitride powders of Examples 1, 2, and 5 were prepared in the same manner as in Example 1 except that the production conditions were changed as shown in Table 1. Table 3 shows evaluation results of the obtained hexagonal boron nitride.

Comparative Example 3

A hexagonal boron nitride powder was prepared in the same manner as in Example 3 except that the production conditions were changed as shown in Table 1. The amount of eluted boron of the coarse hexagonal boron nitride was adjusted by changing conditions for the washing with acid. Table 3 shows the production conditions and the evaluation results of the obtained hexagonal boron nitride.

Comparative Example 4

A hexagonal boron nitride powder was prepared in the same manner as in Example 2 except that the production conditions were changed as shown in Table 1. Table 3 shows the production conditions and the evaluation results of the obtained hexagonal boron nitride.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Production conditions of hexagonal boron nitride powder | Raw material | Boron oxide (g) | 700 | 700 | 700 | 700 | 700 | 700 | 700 |
| | | Carbon (g) | 300 | 300 | 300 | 300 | 300 | 300 | 285 |
| | | Calcium carbonate (g) | 200 | 200 | 200 | 200 | 200 | 200 | 175 |
| | | Boron carbide (g) | 66 | 0 | 180 | 66 | 66 | 66 | 185 |
| | Heat treatment conditions | Treatment temperature (° C.) | 1650 | 1650 | 1650 | 1400 | 1650 | 2000 | 1870 |
| | | Nitrogen dew point temperature (° C.) | −85 | −85 | −85 | −85 | −90 | −85 | −85 |
| | Amount of eluted boron of coarse hexagonal boron nitride (ppm) | | 46 | 18 | 32 | 46 | 46 | 46 | 44 |
| Physical properties of hexagonal boron nitride powder | Average particle size (μm) | | 22.3 | 18.3 | 45.6 | 20.1 | 20.8 | 20.3 | 33.3 |
| | Tap density (g/cm$^3$) | | 0.73 | 0.59 | 0.77 | 0.71 | 0.64 | 0.72 | 0.65 |
| | Amount of eluted sodium (ppm) | | 0.0 | 0.0 | 0.0 | 0.0 | 0.0 | 0.0 | 0.0 |
| | Amount of eluted calcium (ppm) | | 4.8 | 7.1 | 5.1 | 6.3 | 3.8 | 3.3 | 2.3 |
| | Amount of eluted boron (ppm) | | 26 | 14 | 22 | 37 | 19 | 33 | 34 |
| | BET specific surface area $S_W$(m$^2$/g) | | 0.10 | 0.06 | 0.12 | 0.11 | 0.08 | 0.10 | 0.16 |
| | BET specific surface area $S_N$(m$^2$/g) | | 2.02 | 1.42 | 2.21 | 2.06 | 1.92 | 1.96 | 3.06 |
| | BET specific surface area ratio $S_W/S_N$ | | 0.05 | 0.04 | 0.05 | 0.05 | 0.04 | 0.05 | 0.05 |
| Solder heat resistance test | | | Good | Good | Good | Good | Good | Good | Good |

TABLE 2

| | | | Ex. 8 |
|---|---|---|---|
| Production conditions of hexagonal boron nitride powder | Raw material | Anhydrous borax (g) | 80 |
| | | Boron oxide(g) | 50 |
| | | Melamine (g) | 45 |
| | Heat treatment conditions | Treatment temperature (° C.) | 1350 |
| | | Nitrogen dew point temperature (° C.) | −85 |
| | Amount of eluted boron of coarse hexagonal boron nitride (ppm) | | 57 |
| Physical properties of hexagonal boron nitride powder | Average particle size (μm) | | 2.5 |
| | Tap density (g/cm$^3$) | | 0.45 |
| | Amount of eluted sodium (ppm) | | 0.0 |
| | Amount of eluted calcium (ppm) | | 0.5 |
| | Amount of eluted boron (ppm) | | 48 |
| | BET specific surface area $S_W$ (m$^2$/g) | | 0.59 |
| | BET specific surface area $S_N$ (m$^2$/g) | | 9.80 |
| | BET specific surface area ratio $S_W/S_N$ | | 0.06 |
| Solder heat resistance test | | | Good |

TABLE 3

| | | | Comp. Ex. 1 | Comp. Ex. 2 | Comp. Ex. 3 | Comp. Ex. 4 | Comp. Ex. 5 |
|---|---|---|---|---|---|---|---|
| Production conditions of hexagonal boron nitride powder | Raw material | Boron oxide(g) | 700 | 700 | 700 | 700 | 700 |
| | | Carbon(g) | 300 | 300 | 300 | 300 | 300 |
| | | Calcium carbonate(g) | 200 | 200 | 200 | 200 | 200 |
| | | Boron carbide (g) | 66 | 66 | 180 | 0 | 66 |
| | Heat treatment | Treatment temperature (° C.) | 1000 | 1600 | 1600 | No treatment | No treatment |
| | | Nitrogen dew point temperature (° C.) | −85 | −70 | −85 | | |
| | Amount of eluted boron of coarse hexagonal boron nitride (ppm) | | 46 | 46 | 326 | 18 | 46 |

TABLE 3-continued

| | | Comp. Ex. 1 | Comp. Ex. 2 | Comp. Ex. 3 | Comp. Ex. 4 | Comp. Ex. 5 |
|---|---|---|---|---|---|---|
| Physical properties of hexagonal boron nitride powder | Average particle size (μm) | 20.2 | 20.3 | 44.7 | 18.8 | 21.1 |
| | Tap density ($g/cm^3$) | 0.74 | 0.70 | 0.81 | 0.62 | 0.77 |
| | Amount of eluted sodium (ppm) | 0.0 | 0.0 | 3.3 | 0.0 | 0.0 |
| | Amount of eluted calcium (ppm) | 4.8 | 4.9 | 138 | 6.8 | 5.2 |
| | Amount of eluted boron (ppm) | 31 | 20 | 227 | 18 | 46 |
| | BET specific surface area $S_W$ ($m^2/g$) | 0.17 | 0.16 | 0.27 | 0.17 | 0.26 |
| | BET specific surface area $S_N$ ($m^2/g$) | 1.93 | 2.10 | 2.73 | 1.55 | 2.43 |
| | BET specific surface area ratio $S_W/S_N$ | 0.09 | 0.08 | 0.10 | 0.11 | 0.11 |
| Solder heat resistance test | | Poor | Poor | Poor | Poor | Poor |

All of the hexagonal boron nitride powders of Example 1 to 8 had a BET specific surface area ratio $S_W/S_N$ of 0.07 or less, and all of the resin compositions using these hexagonal boron nitride powders were good in the solder heat resistance test. On the other hand, all the resin compositions using the hexagonal boron nitride powders of Comparative Example 1 to 5 having a BET specific surface area ratio $S_W/S_N$ of more than 0.07 were poor in the solder heat resistance test. Thus, it was shown that the solder heat resistance of the resin composition was improved by using the hexagonal boron nitride powder having a small $S_W/S_N$.

The invention claimed is:

1. A hexagonal boron nitride powder having a ratio ($S_W/S_N$) of a BET specific surface area ($S_W$) measured using water as an adsorbed species to a BET specific surface area ($S_N$) measured using nitrogen as an adsorbed species of 0.07 or less.

2. The hexagonal boron nitride powder according to claim 1, wherein an amount of eluted boron is 40 ppm or less, an amount of eluted sodium is 1 ppm or less, and an amount of eluted calcium is 50 ppm or less.

3. The hexagonal boron nitride powder according to claim 1, wherein an average particle size is 1 to 150 μm, and the BET specific surface area ($S_N$) measured using nitrogen as the adsorbed species is 15 $m^2/g$ or less.

4. A resin composition comprising the hexagonal boron nitride powder according to claim 1 and a resin.

5. The resin composition according to claim 4, wherein the resin composition is for a heat dissipation material.

* * * * *